United States Patent [19]
Ide

[11] 3,842,657
[45] Oct. 22, 1974

[54] LEVEL DETECTOR USING FLUID EJECTION FROM BORES COMMUNICATING WITH A VARIABLE PRESSURE CHAMBER

[75] Inventor: Tatsuo Ide, Fukuyama, Japan

[73] Assignee: Nippon Kokan Kabushiki Kaisha, Tokyo, Japan

[22] Filed: Apr. 26, 1973

[21] Appl. No.: 354,761

[30] Foreign Application Priority Data
Jan. 19, 1973  Japan.................................. 48-8312

[52] U.S. Cl....................... 73/37.5, 73/198, 73/302
[51] Int. Cl....................... G01b 13/00, G01f 23/10
[58] Field of Search ....... 73/37, 301, 302, 291, 213, 73/37.5; 200/61.21; 340/246

[56] References Cited
UNITED STATES PATENTS

| | | | |
|---|---|---|---|
| 2,559,436 | 7/1951 | Isserstedt | 73/302 |
| 2,640,977 | 6/1953 | Parisi | 200/61.21 X |
| 3,171,275 | 3/1965 | Miller | 73/37.5 |
| 3,262,313 | 7/1966 | Hanna | 73/302 |
| 3,290,938 | 12/1966 | Miller | 73/290 R |
| 3,357,235 | 12/1967 | Saito | 73/37 |
| 3,459,035 | 8/1969 | Russon | 73/37.5 |

Primary Examiner—Richard C. Queisser
Assistant Examiner—Daniel M. Yasich
Attorney, Agent, or Firm—Flynn & Frishauf

[57] ABSTRACT

The level detector device comprises a variable pressure chamber and a plurality of fluid ejection bores downstream of the chamber, through which a fluid under varying pressure is ejected into a container containing a particulate or powdery material, and detects changes of pressure in the chamber which is representative of a rate of closure of the fluid ejection bores dependent on the level of the material in the container.

6 Claims, 3 Drawing Figures

LEVEL DETECTOR USING FLUID EJECTION FROM BORES COMMUNICATING WITH A VARIABLE PRESSURE CHAMBER

BACKGROUND OF THE INVENTION

This invention relates to a level detector device for detecting the level of a powdery or particulate material by utilizing variation of pressure caused by an ejecting fluid, the material being in a container, such as a vessel, hopper, pipeline and the like.

Various devices have been in use for detecting the level of a powdery or particulate material contained in a container. Among them are those employing a diaphragm which shifts responsive to pressure of the material, and a rotary fan whose torque is changed by the material, and those utilizing changes in electrostatic capacity of the material, utilizing shifts in bending due to contact with the material, utilizing changes in electric resistance of the material, utilizing sounding by use of a skin, utilizing masking effects of ultrasonic waves or radioactive rays, and measuring the entire amount of material. Devices of such conventional arrangement require a movable or rotatable element operative in the body of particulate material, or an electrically or mechanically complex mechanism tending to cause mishaps, so that the device should be operated by a skilled person.

SUMMARY OF THE INVENTION

The principal object of the invention is to eliminate these drawbacks and to provide a device for detecting the level of a powdery or particulate material, which is simple in mechanical construction and yet provides rigid construction in which operational mishaps are not likely to occur.

To attain this object, the invention provides an arrangement in which a fluid under constant pressure is fed into a variable pressure chamber and then ejected into a container through a plurality of substantially vertically arranged ejector bores, said chamber including a neck or reduced portion and an enlarged generally conically shaped portion downstream thereof.

The vertically arranged bores are gradually closed from the lowermost bore and upward by a powdery or particulate material in the container, as the material level rises, to reduce fluid ejection into the container and hence to raise the pressure in the variable pressure chamber. Inversely, downward movement of the material level results in a decrease in the pressure within the chamber. A suitable detector or detector element is connected to the external end of an opening communicating with the interior of the chamber and operates to detect an amount of increase or decrease of said pressure representative of the level of the material within the container.

The device has only a fluid passage which sends and ejects into the container a constantly pressurized fluid fed by a fluid supply and requires no movable element, so that the entire structure of the device is simple and rigid. The fluid passage is maintained at a pressure higher than atmospheric pressure so that the invasion of the particulate material toward the fluid passage as well as adherence of the material onto the fluid passage, as is experienced with a device of a known type, can be eliminated.

The detector or detector element connected to the detecting opening may be of a known type. For example, a pressure indicating device, such as a pressure gauge, may be used to detect the level of the material by direct reading of the pressure acting thereto. Further, a pressure responsive switch may be used to control associated electrical or fluidic equipments responsive to the level being detected. When automatic control is desired, outputs of the detector element may be used to actuate an automatic control system to keep the level constant, to effect program control or to effect other level control. In each of the above cases, the device and associated system may be remote controlled by providing a sufficiently long conduit for connection between the detector element and the pressure detecting opening.

The fluid used for the device may be widely selected depending upon the nature of a powdery or particulate material whose level is to be detected, examples including air and an inert gas. The variable pressure chamber may be of a venturi type or may be of any suitable shape which is capable of producing variation of pressure responsive to the amount of fluid flow. The dimensions and arrangement of the ejector bores may likewise be selected depending on the nature and size of the powdery or particulate material and the shape of the container containing such material.

DETAILED DESCRIPTION OF THE INVENTION

Figure 1:
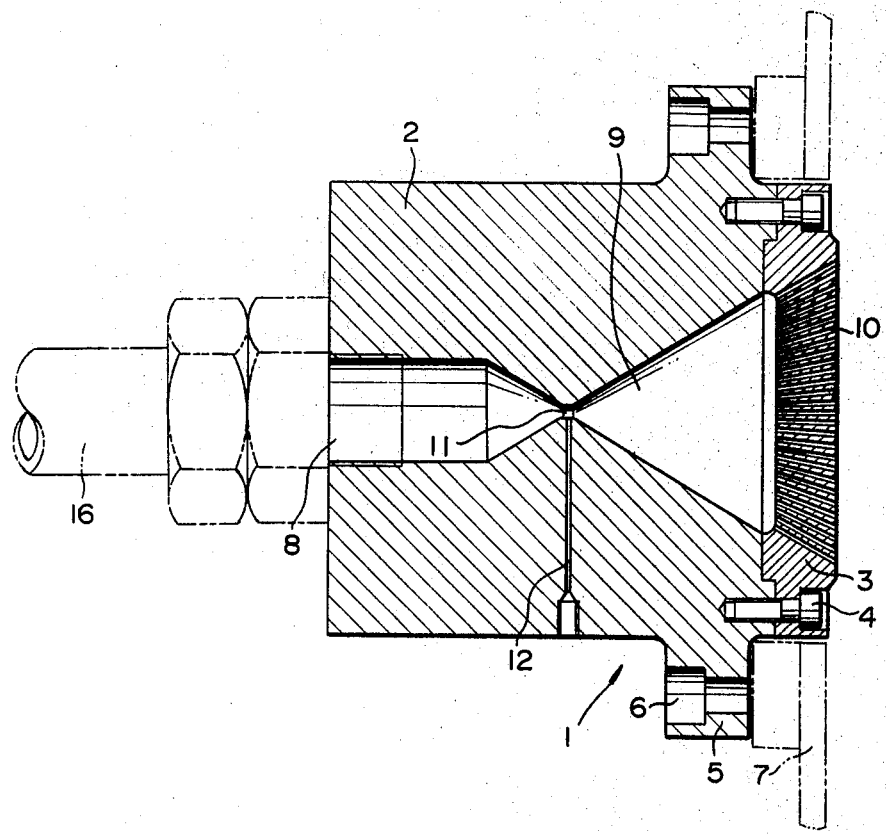
FIG. 1 is a cross sectional elevation of a level detector device embodying this invention.
Figure 2:
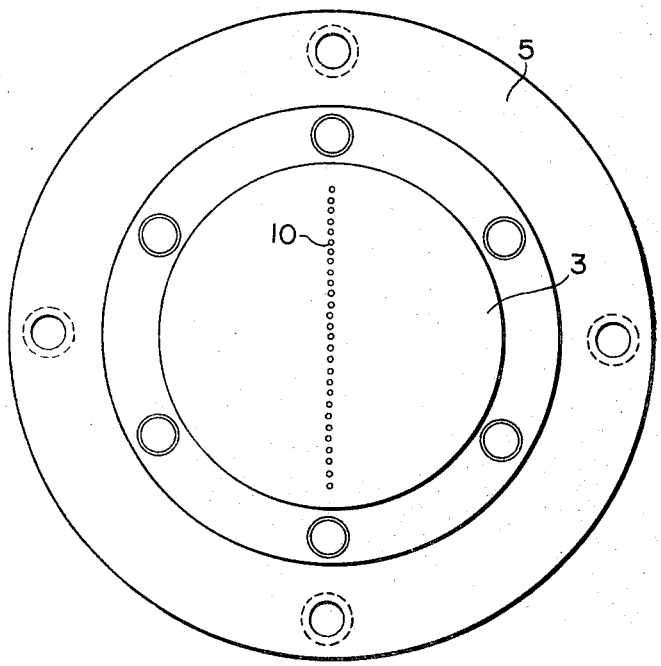
FIG. 2 is a plan view of the device of FIG. 1.

One embodiment of the invention will now be described by reference to the accompanying drawings. The level detecting device 1 comprises a generally cylindrical detector body 2 and a cover 3 in the form of a circular plate having a plurality of bores 10 therein. The cover 3 is connected to the detector body 2 by means of screws 4. The entire structure may be mounted on a container or hopper 7 at threaded openings 6 formed in a flange 5 of the detector body 2. Within the level detecting device 1 is formed a fluid passage which runs longitudinally therethrough from a fluid inlet port 8 formed in one end of the detector body 2 and communicates with the interior of the hopper 7 through a variable pressure chamber 9 and the plurality of fluid ejection bores 10 which are formed in the cover 3. The bores 10 are arranged radially with respect to the horizontal axis of the chamber 9. The variable pressure chamber 9 includes a neck or reduced portion 11 of the venturi type located intermediate the fluid passage and an enlarged portion downstream thereof. The enlarged portion of the chamber is generally conically shaped. In the detector body 2 is provided an opening 12 having its inner end open to the reduced portion 11 of the chamber and its opposite end communicating with the atmosphere.

Figure 3:
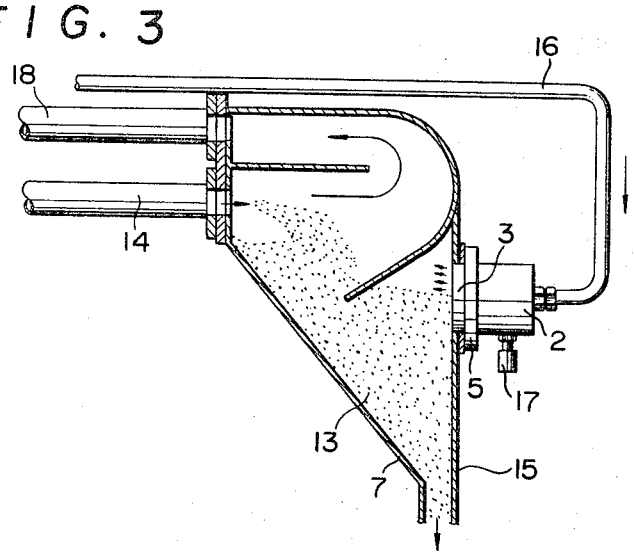
FIG. 3 is a schematic view of the device of FIG. 1 as used in actual application.

FIG. 3 illustrates one mode of the level detector device as applied in a practical arrangement. In the illustrated example, the device 1 is mounted on one side of the hopper 7 which stores a particulate material 13, such as a flux for welding, supplied by a feed pipe 14 and discharges the material down through a discharge opening 15. A fluid or air supply pipe 16 is connected to the fluid inlet 8. At the pressure detecting opening 12 is provided, according to the embodiment shown, a pressure responsive switch 17.

The air supply pipe 16 introduces air under constant pressure into the passage within the level detector device through the inlet port 8. The air thus supplied is ejected into the interior of the hopper 7 through the variable pressure chamber 9 and the ejector bores 10 and discharged through an outlet pipe 18.

The level of the particulate material 13 is dependent on the amount of the material supplied by the supply pipe 14 and the amount to be discharged through the discharge opening 15. When the level of the material is elevated as far as to a certain level of the ejector bores 10, the bores 10 lying below such level are closed by the material, whereby the overall amount of the air ejected through the ejector bores 10 is decreased and the pressure within the chamber is increased. Lowering of the level causes the amount of air flow to increase resulting in a decrease in the fluid pressure in the chamber 9.

An increase and decrease in the pressure are transmitted through the pressure detecting opening 12 to, and render operative, the pressure responsive switch 17.

The level detector device of the arrangement described is simple in construction without requiring any additional equipment and hence can be formed very rigid, so that the inoperativeness of the device is minimized. It should be appreciated that the shape and arrangement of the ejector bores 10, and the shape of the reduced portion 11 of the chamber can be widely modified within the scope of the invention. As has been already described, any such suitable device as is known to those skilled in the art may be employed as the pressure responsive switch. Since the device requires no electric power in the vicinity of the hopper, it can be protected from the danger of explosion. Further, the device can be used for a variety of kinds of powdery or particulate material and for a variety of applications. The device operates to effect substantially continuous level detection because of the provision of a number of vertically arranged fluid ejection bores.

What is claimed is:

1. A level detector device for detecting the level of powdery or particulate material, comprising:
    a detector body;
    a constant pressure fluid source coupled to supply fluid under substantially constant pressure to said detector body;
    a variable pressure chamber, having a horizontal axis, formed within said detector body and receiving said fluid from said source, said chamber including a reduced Venturi-type portion and an expanded generally conically shaped portion downstream of said reduced portion;
    a pressure detecting opening communicating with said reduced portion of said chamber;
    a plurality of fluid ejecting bores formed in the downstream side of said detector body and which communicate with said chamber, said fluid ejecting bores being arranged radially with respect to the horizontal axis of said chamber; and
    means coupled to said pressure detecting opening to detect a variation of pressure within said chamber, said variation of pressure being representative of a rate of closure of said fluid ejecting bores by the action of the material whose level is to be detected.

2. A level detector device according to claim 1 wherein said means to detect a variation of pressure within said chamber includes a pressure responsive switch coupled to said pressure detecting opening.

3. A level detector device according to claim 1 wherein said constant pressure fluid source comprises a source of air under constant pressure.

4. A level detector device according to claim 1 wherein said constant pressure fluid source comprises a source of inert gas under constant pressure.

5. A level detector device according to claim 1 including means for securing said detector body to a substantially vertically extending wall of a vessel containing said powdery or particulate material.

6. A level detector device according to claim 1 wherein said fluid ejecting bores have openings located one above the other in a substantially vertical plane.

* * * * *